US011978307B2

(12) United States Patent
Sun et al.

(10) Patent No.: US 11,978,307 B2
(45) Date of Patent: May 7, 2024

(54) STATUS SWITCHING METHOD AND APPARATUS, EDGE COMPUTING DEVICE AND COMPUTER STORAGE MEDIUM

(71) Applicant: SENSETIME INTERNATIONAL PTE. LTD., Singapore (SG)

(72) Inventors: Bing Sun, Singapore (SG); Xinxin Wang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 192 days.

(21) Appl. No.: 17/489,051

(22) Filed: Sep. 29, 2021

(65) Prior Publication Data

US 2023/0082837 A1 Mar. 16, 2023

Related U.S. Application Data

(63) Continuation of application No. PCT/IB2021/058758, filed on Sep. 26, 2021.

(30) Foreign Application Priority Data

Sep. 14, 2021 (SG) ............................ 10202110082R

(51) Int. Cl.
*G07F 17/32* (2006.01)

(52) U.S. Cl.
CPC ...... *G07F 17/3227* (2013.01); *G07F 17/3269* (2013.01)

(58) Field of Classification Search
CPC . G07F 17/322; G07F 17/3227; G07F 17/3269
See application file for complete search history.

(56) References Cited

U.S. PATENT DOCUMENTS

| | | | | |
|---|---|---|---|---|
| 10,650,550 B1 * | 5/2020 | Mcclellan | ............. | G07F 17/322 |
| 10,687,023 B1 * | 6/2020 | McClellan | ............. | G06V 20/52 |
| 11,651,646 B2 * | 5/2023 | Shigeta | ................. | G07F 17/322 463/25 |
| 2007/0077987 A1 * | 4/2007 | Gururajan | ............ | G07F 17/322 463/22 |
| 2007/0111773 A1 * | 5/2007 | Gururajan | ........... | G07F 17/3202 463/11 |

(Continued)

FOREIGN PATENT DOCUMENTS

CN 106504440 A 3/2017

OTHER PUBLICATIONS

International Search Report in the international application No. PCT/IB2021/058758, dated Jan. 21, 2022, 6 pgs.

(Continued)

*Primary Examiner* — Chase E Leichliter
(74) *Attorney, Agent, or Firm* — Cooper Legal Group, LLC

(57) ABSTRACT

Provided are a status switching method and apparatus, an edge computing device and a computer storage medium. The method comprises: in response to that a manual status switching request to a game platform is acquired, determining a current game status of the game platform; and in response to that the current game status satisfies a switching condition corresponding to the manual status switching request, switching the game status of the game platform from the current game status to a target game status corresponding to the manual status switching request.

18 Claims, 3 Drawing Sheets

(56) References Cited

U.S. PATENT DOCUMENTS

| | | | | |
|---|---|---|---|---|
| 2007/0192872 | A1* | 8/2007 | Rhoads | H04W 99/00 707/E17.113 |
| 2008/0026807 | A1* | 1/2008 | Moshal | G07F 17/3269 463/16 |
| 2009/0131151 | A1* | 5/2009 | Harris | G07F 17/3232 463/22 |
| 2010/0056271 | A1* | 3/2010 | Stasi | G07F 17/40 463/30 |
| 2010/0273547 | A1* | 10/2010 | Stasi | G07F 17/3269 463/16 |
| 2010/0331085 | A1* | 12/2010 | Nagano | G07F 17/3276 463/31 |
| 2012/0106831 | A1* | 5/2012 | Hsu | G06V 20/00 382/154 |
| 2017/0039807 | A1* | 2/2017 | Shigeta | G06Q 50/34 |
| 2018/0232987 | A1 | 8/2018 | Shigeta | |
| 2018/0300984 | A1* | 10/2018 | Shigeta | A63F 3/00157 |
| 2018/0350192 | A1 | 12/2018 | Shigeta | |
| 2018/0350193 | A1* | 12/2018 | Shigeta | A63F 1/18 |
| 2018/0357850 | A1* | 12/2018 | Moore | G07F 17/3211 |
| 2018/0374302 | A1 | 12/2018 | Shigeta | |
| 2019/0005767 | A1 | 1/2019 | Shigeta | |
| 2019/0102988 | A1 | 4/2019 | Shigeta | |
| 2019/0102989 | A1 | 4/2019 | Shigeta | |
| 2019/0172311 | A1 | 6/2019 | Shigeta | |
| 2019/0251784 | A1 | 8/2019 | Shigeta | |
| 2019/0251785 | A1 | 8/2019 | Shigeta | |
| 2019/0251786 | A1* | 8/2019 | Shigeta | A63F 3/00157 |
| 2019/0333326 | A1 | 10/2019 | Shigeta | |
| 2019/0333327 | A1 | 10/2019 | Shigeta | |
| 2019/0340873 | A1 | 11/2019 | Shigeta | |
| 2019/0392680 | A1 | 12/2019 | Shigeta | |
| 2020/0118390 | A1 | 4/2020 | Shigeta | |
| 2020/0242801 | A1* | 7/2020 | McClellan | G06T 7/80 |
| 2020/0265672 | A1 | 8/2020 | Shigeta | |
| 2020/0349808 | A1 | 11/2020 | Shigeta | |
| 2020/0349809 | A1 | 11/2020 | Shigeta | |
| 2020/0349810 | A1 | 11/2020 | Shigeta | |
| 2020/0349811 | A1 | 11/2020 | Shigeta | |
| 2020/0372752 | A1 | 11/2020 | Shigeta | |
| 2020/0394870 | A1* | 12/2020 | Shigeta | G07F 17/3223 |
| 2021/0012612 | A1 | 1/2021 | Shigeta | |
| 2021/0233353 | A1 | 7/2021 | Shigeta | |
| 2021/0233354 | A1* | 7/2021 | Shigeta | G07F 17/3241 |
| 2021/0343113 | A1 | 11/2021 | Shigeta | |
| 2021/0343114 | A1 | 11/2021 | Shigeta | |
| 2021/0350665 | A1 | 11/2021 | Shigeta | |
| 2022/0005315 | A1 | 1/2022 | Shigeta | |
| 2023/0082837 | A1* | 3/2023 | Sun | G07F 17/3269 463/40 |

OTHER PUBLICATIONS

Written Opinion of the International Search Authority in the international application No. PCT/IB2021/058758, dated Jan. 21, 2022, 7 pgs.

* cited by examiner

STATUS SWITCHING METHOD AND APPARATUS, EDGE COMPUTING DEVICE AND COMPUTER STORAGE MEDIUM

CROSS-REFERENCE TO RELATED APPLICATION(S)

The application is continuation of international application PCT/IB2021/058758 filed on 26 Sep. 2021, which claims priority to Singaporean patent application No. 10202110082R filed with IPOS on 14 Sep. 2021. The contents of international application PCT/IB2021/058758 and Singaporean patent application No. 10202110082R are incorporated herein by reference in their entireties.

TECHNICAL FIELD

The disclosure relates to computer visual processing technologies and relates to, but not limited to, a status switching method and apparatus, an edge computing device and a computer storage medium.

BACKGROUND

At present, a game of a game platform may have various statuses, for example, halt status, initial status before the game is started, and statuses corresponding to different stages after the game is started. In order to guarantee smooth implementation of the game, it is to be settled urgently how to switch the game status of the game platform accurately.

SUMMARY

Embodiments of the disclosure may provide a status switching method and apparatus, an edge computing device and a computer storage medium, which may obtain a detection result of a money substitute accurately.

The embodiments of the disclosure provide a status switching method. The method induces the following operations.

In response to that a manual status switching request to a game platform is acquired, a current game status of the game platform is determined.

In response to that the current game status satisfies a switching condition corresponding to the manual status switching request, the game status of the game platform is switched from the current game status to a target game status corresponding to the manual status switching request.

In some embodiments, the operation that in response to that the current game status satisfies a switching condition corresponding to the manual status switching request, the game status of the game platform is switched from the current game status to a target game status corresponding to the manual status switching request includes the following operations.

A target interface called by the manual status switching request is determined.

In a case where the current game status satisfies a preset switching condition corresponding to the target interface, the game status of the game platform is switched from the current game status to the target game status corresponding to the manual status switching request.

In some embodiments, the method further includes the following operations.

In a case where the target interface is a first interface and the current game status is in an initial status when a game is not started, it is determined that the current game status satisfies the preset switching condition corresponding to the target interface, the first interface being called in response to the first status switching request, the first status switching request being used for requiring to switch the current game status of the game platform to a status corresponding to a first game stage, and the first game stage being a first game stage after the game is started.

It is determined that the target game status is a status corresponding to the first game stage.

In some embodiments, the method further includes the following operations.

In a case where the target interface is a second interface and the current game status is in a status corresponding to the first game stage, it is determined that the current game status satisfies the preset switching condition corresponding to the target interface, the second interface being called in response to the second status switching request, the second status switching request being used for requiring to switch the current game status of the game platform to the initial status when the game is not started, and the first game stage being the first game stage after the game is started.

It is determined that the target game status is the initial status when the game is not started.

In some embodiments, the method further includes the following operations.

In a case where the target interface is a third interface and the current game status is in a game halt status, it is determined that the current game status satisfies the preset switching condition corresponding to the target interface, the third interface being called in response to the third status switching request, the third status switching request being used for requiring to switch the current game status of the game platform to a status corresponding to a second game stage It is determined that the target game status is a status corresponding to the second game stage, and the second game stage is not the first game stage after the game is started.

In some embodiments, the method further includes the following operations.

In a case where the target interface is a fourth interface and the current game status is in the game halt status, it is determined that the current game state satisfies the preset switching condition corresponding to the target interface, the fourth interface being called in response to the fourth status switching request, the fourth status switching request being used for requiring to switch the current game state of the game platform to a status corresponding to a first game stage, and the first game stage being a first game stage after the game is started.

It is determined that the target game status is a status corresponding to the first game stage.

In some embodiments, the method further includes the following operations.

The manual status switching request of the game platform sent by a game management system is acquired, the game management system generating the manual status switching request in response to a manual status switching operation of a game manager.

In some embodiments, the method further includes the following operations.

In response to that a recognition result obtained by recognizing a game event and/or a game object in a game platform image satisfies an automatic switching condition and the current game state is different from a target game status corresponding to the automatic switching condition, the manual status switching request of the game platform is acquired, the target game status corresponding to the manual switching request being as same as the target game status corresponding to the automatic switching condition.

In some embodiments, the method further includes the following operations.

In a case where the first game stage is over according to the recognition result, it is determined that the recognition result satisfies the automatic switching condition, the target game status corresponding to the automatic switching condition being a status corresponding to the second game stage; the first game stage is the first game stage after the game is started, and the second game stage is not the first game stage after the game is started.

In some embodiments, the current game status represents the status corresponding to the second game stage, and the second game stage is not the first game stage after the game is started.

The method further includes the following operations. In a case where it is determined that an abnormal game event occurs and/or the status of the game object is abnormal according to the recognition result, it is determined the automatic switching condition according to the recognition result, the target game status corresponding to the automatic switching condition being the game halt status.

In some embodiments, the method further includes the following operations.

In a case where the second game stage is over according to the recognition result, it is determined that the recognition result satisfies the automatic switching condition, the target game status corresponding to the automatic switching condition being a status corresponding to the first game stage, wherein the first game stage is the first game stage after the game is started, and the second game stage is the last game stage after the game is started.

The embodiments of the disclosure further provide a status switching apparatus, the apparatus including a determination module and a processing module.

The determination module is configured to, in response to that a manual status switching request to a game platform is acquired, determine a current game status of the game platform.

The processing module is configured to, in response to that the current game status satisfies a switching condition corresponding to the manual status switching request, switch the game status of the game platform from the current game status to a target game status corresponding to the manual status switching request.

The embodiments of the disclosure further provide an edge computing device, the edge computing device including a processor and a memory configured to store a computer program capable of running on the processor.

The processor is configured to run the computer program to execute the any one status switching method.

The embodiments of the disclosure further provide a computer readable storage medium, having a computer program stored therein, wherein any one status switching method is realized when the computer program is executed by the processor.

In the status switching method and apparatus, the edge computing device and the computer storage medium provided by the embodiments of the disclosure, the method includes the following operations. In response to that a manual status switching request to a game platform is acquired, a current game status of the game platform is determined. In response to that the current game status satisfies a switching condition corresponding to the manual status switching request, the game status of the game platform is switched from the current game status to a target game status corresponding to the manual status switching request.

It can be seen that in the embodiments of the disclosure, the current game status of the game platform may be switched according to the manual status switching request of the game platform. As the manual status switching request of the game platform may reflect an actual status switching demand, the game status of the game platform may be switched accurately according to the manual status switching request of the game platform, such that the game may run normally and sequentially.

It is to be understood that the above general descriptions and detailed descriptions below are only exemplary and explanatory but not intended to limit the present disclosure.

DETAILED DESCRIPTION

Figure 1:
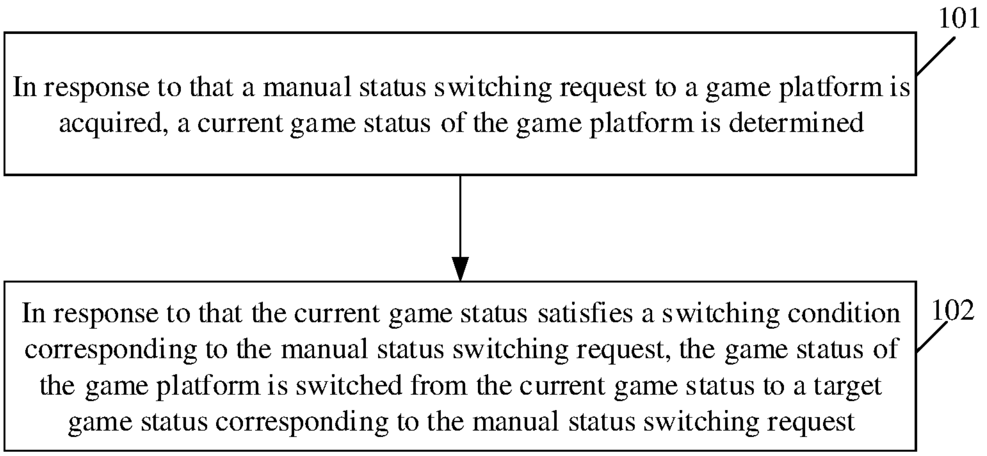
FIG. 1 is a flowchart of a status switching method of an embodiment of the disclosure.

The disclosure will further be described below in combination with the drawings and the embodiments in detail. It is to be understood that the embodiments provided herein are only adopted to explain the disclosure and not intended to limit the disclosure. In addition, the embodiments provided below are not all embodiments implementing the disclosure but part of embodiments implementing the disclosure, and the embodiments of the disclosure may be freely combined for implementation without conflicts.

It is to be noted that, in the embodiments of the disclosure, terms "include" and "contain" or any other variant thereof is intended to cover nonexclusive inclusions herein, so that method or device including a series of elements not only includes those clearly recorded elements but also includes other elements which are not clearly listed or further includes intrinsic elements for implementing the method or the device. Under the condition of no more limitations, an element defined by a statement "including a/an" does not exclude existence of another related element in a method or device including the element (for example, step in the method or a unit in the device, the unit may be, for example, part of a circuit, part of a processor and part of a program or software).

For example, a status switching method provided in the embodiments of the disclosure includes a series of steps, but the status switching method provided in the embodiments of the disclosure is not limited to the recorded steps. Similarly, a status switching device provided in the embodiments of the disclosure includes a series of modules, but the device provided in the embodiments of the disclosure is not limited to include the clearly recorded modules and may further include a module required to be arranged when related information is acquired or processing is performed based on information.

In the disclosure, term "and/or" is only an association relationship describing associated objects and represents that three relationships may exist. For example, A and/or B may represent three conditions: i.e., independent existence of A, existence of both A and B and independent existence of B. In addition, term "at least one" in the disclosure represents any one of multiple or any combination of at least two of multiple. For example, including at least one of A, B and C may represent including any one or more elements selected from a set formed by A, B and C.

The embodiments of the disclosure may be applied to an edge computing device in a game scene, and may be operated together with numerous other universal or dedicated computing system environments or configurations. Here, the edge computing device may be a thin client, a thick client, a handheld or laptop device, a microprocessor-based system, a set-top box, a programmable consumer electronic product, a network personal computer, a minicomputer system, etc.

The edge computing device may include a program module that executes an instruction. Under a normal condition, the program module may include a routine, a program, a target program, a component, a logic, a data structure and the like, and they execute specific tasks or implement specific abstract data types. The computer system/server may be implemented in a distributed cloud computing environment, and in the distributed cloud computing environment, tasks are executed by a remote processing device connected through a communication network. In the distributed cloud computing environment, the program module may be in a storage medium of a local or remote computer system including a storage device.

The edge computing device may be interacted with a service-side device in data, for example, the service-side device may send data to the edge computing device by calling the edge computing device, and the edge computing device may process the received data after receiving the data from the service-side device via a corresponding interface. The edge computing device may further send the data to the service-side device. Here, the service-side device may be a small computer system, a large computer system, a distributed cloud computing technical environment including any abovementioned systems and etc.

An application scene of the embodiments of the disclosure will be exemplarily described below.

In the game scene, a running state of each game may be monitored through a computer vision processing technology.

In some embodiments, the game in the game scene may be poker or other games on a game platform. No limits are made thereto in the embodiments of the disclosure.

In the embodiments, Computer Vision (CV), as a science researching how to make machines "see", refers to a technology of identifying, tracking, and measuring targets using video cameras and computers instead of human eyes, and further performing image processing. In a game process, three cameras may be used to detect what happens on the game platform for further analysis. The game platform may be a physical tabletop platform or another physical platform.

FIG. 1 is a flowchart of a status switching method according to an embodiment of the disclosure. As shown in FIG. 1, the flow may include the following operations.

In S101, in response to that a manual status switching request to a game platform is acquired, a current game status of the game platform is determined.

In the embodiments of the disclosure, the manual status switching request is used for requiring changing the current game status of the game platform. Exemplarily, the service-side device may receive the manual status switching request and send the manual status switching request to the edge computing device by calling the interface of the edge computing device.

In some embodiments, the manual status switching request of the game platform sent by a game management system may be acquired, and the game management system is in response to a manual status switching operation of a game manager to generate the manual status switching request.

In some embodiments, the game management system is located in the service-side device, the service-side device may be interacted with a locally arranged electronic device of the game platform in data, the electronic device is provided with a status button or other input apparatuses for a user to input a status switching instruction, and after receiving the status switching instruction input by the user, the electronic device may send the manual status switching request to the service-side device.

In the embodiments, the manual status switching request is used for requiring the game status of the game platform switched. Correspondingly, the status switching request further carries the corresponding target game status. The service-side device may call the interface corresponding to the target game status on the edge computing device according to the target game status corresponding to the manual status switching request and send the manual status switching request to the edge computing device via the interface corresponding to the target game. Here, the interface corresponding to one target game status may be either an interface or a plurality of interfaces.

In the embodiments of the disclosure, various game statuses of the game platform may be determined for the game type in the game platform. The current game status of the game platform may be one game status of the various game statuses. Exemplarily, various game statuses of the game platform may include an initial status representing that the game is not started, a status corresponding to a first game stage, a status corresponding to a second game stage, game halt status and etc.

The initial status representing that the game is not started represents the game status of the game platform electrified when the game is not started; the status after the game is started may be divided into the status corresponding to the first game stage, the status corresponding to the second game stage and the like according to a time sequence. Here, the first game stage represents the first game stage after the game is started, and the second game stage represents not the first game stage after the game is started. Exemplarily, the second game stage may be one game stage or may include a plurality of game stages. The game halt status represents a status in which the game may not run normally as a result of abnormal game events and/or the status of the game object is abnormal. In some embodiments, whether the abnormal game events occur and/or the status of the game object is abnormal or not may be determined according to the recognition result of the image of the game platform.

In some embodiments, the current game status of the game platform may be represented on the locally arranged electronic device of the game platform. Exemplarily, different game statuses may be represented by different colors or characters.

In some embodiments, the current game status of the game platform may be stored, for example, the current game status of the game platform may be stored to a remote dictionary server (Redis) storage system, Redis is a key-value pair storage system written by Salvatore Sanfilippo, which is a cross-platform non-relationship database, and Redis is a distributed open source a key-value storage database which is compiled by American national standards institute (ANSI) C Language, complies with Berkeley Software Distribution (BSD) protocol, supports a network and may be based on a memory with optional persistence, and provides application programming interfaces (API) of various languages.

In 102, in response to that the current game status satisfies a switching condition corresponding to the manual status switching request, the game status of the game platform is switched from the current game status to a target game status corresponding to the manual status switching request.

In the embodiments of the disclosure, in a case where the edge computing device receives the manual status switching request, it may be in response to the manual status switching request. A responsive result to the manual status switching request may be rejection of the manual status switching request or status switching according to the manual status switching request. A responsive result to the manual status switching request is that in a case where the status is switched according to the manual status switching request, the game status of the game platform may be switched from the current game status to the target game status according to the manual status switching request.

The manual status switching request may be sent by user equipment connected with the edge computing device. In an actual scene, the game manager may manage a game progress by operation by the user equipment. in a case where in the game process, the game status of the game platform may not be switched automatically or a program for switching the game status is mistaken as a result of abnormal events, the manager may operate status switching on the user equipment manually, that is, send the manual status switching request to switch the game platform to a correct game status.

Exemplarily, after the game status of the game platform is switched from the current game status to the target game status, the electronic device may further represent the target game status, and the current game status may be updated in the Redis storage system.

In practical applications, S101 to S102 may be implemented using a processor in the edge computing device. The processor may be at least one of an Application Specific Integrated Circuit (ASIC), a Digital Signal Processor (DSP), a Digital Signal Processing Device (DSPD), a Programmable Logic Device (PLD), a Field-Programmable Gate Array (FPGA), a Central Processing unit (CPU), a controller, a microcontroller, or a microprocessor.

It can be seen that in the embodiments of the disclosure, the current game status of the game platform may be switched according to the manual status switching request of the game platform. As the manual status switching request of the game platform may reflect an actual status switching demand, the game status of the game platform may be switched accurately according to the manual status switching request of the game platform, such that the game may run normally and sequentially.

In some embodiments, the implementation mode of S102 may include the following operations. The target interface called by the manual status switching request is determined. In a case where the current game status satisfies a preset switching condition corresponding to the target interface, the game status of the game platform is switched from the current game status to the target game status corresponding to the manual status switching request.

Here, the target interface called by the manual status switching request may be a pre-appointed interface. The pre-appointed interface may include at least one interface. Each interface in the at least one interface corresponds to one switching mode of the game status, and different interfaces may different in switching modes of the game status.

In the embodiments of the disclosure, the switching mode of the game status corresponding to the target interface may be determined according to the type of the target interface called by the manual status switching request. in a case where the current game state of the game platform is matched with the switching mode of the game status corresponding to the target interface, it may be considered that the current game status of the game platform satisfies the preset switching condition corresponding to the target interface. In a case where the current game state of the game platform is not matched with the switching mode of the game status corresponding to the target interface, it may be considered that the current game status of the game platform does not satisfy the preset switching condition corresponding to the target interface.

Exemplarily, the switching mode of the game status corresponding to the target interface is to switch a game status D to a game status E. in a case where the current game state of the game platform is the game status D, the current game state of the game platform is matched with the switching mode of the game status corresponding to the target interface, and the current game status of the game platform satisfies the preset switching condition corresponding to the target interface. In a case where the current game state of the game platform is not the game status D, it illustrates that the current game state of the game platform is not matched with the switching mode of the game status corresponding to the target interface, the current game status of the game platform does not satisfy the preset switching condition corresponding to the target interface.

It is to be understood that in a case where the current game status satisfies a preset switching condition corresponding to the target interface, the game status of the game platform is switched from the current game status to the target game status, which is beneficial to switching of the game status accurately.

In some embodiments, in a case where the target interface is a first interface and the current game status is in an initial status when a game is not started, the current game status satisfying the preset switching condition corresponding to the target interface is determined, the first interface being called in response to the first status switching request, the first status switching request being used for requiring to switch the current game status of the game platform to a status corresponding to a first game stage, and the first game stage being a first game stage after the game is started.

The target game status is determined as a status corresponding to the first game stage.

In the embodiments of the disclosure, after the game platform is started to be electrified, the current game status of the game platform is the initial status when the game is not started.

In a case where the edge computing device receives the first status switching request via the first interface, the edge computing device may judge whether the current game status of the game platform is the initial status when the game is not started. If the current game status of the game platform is the initial status when the game is not started, it may be determined that the target game status is the status corresponding to the first game stage, such that the current game status of the game platform is switched to the status corresponding to the first game stage. If the current game status of the game platform is not the initial status when the game is not started, the first status switching request may be rejected and an error code (Error Code) representing that the first status switching request is rejected is sent to the service-side device.

It can be seen that in a case where the target interface is a first interface and the current game status is in an initial status when a game is not started, the initial status when a game is not started may be switched to the status corresponding to the first game stage accurately.

In some embodiments, in a case where the target interface is a second interface and the current game status is the status corresponding to the first game stage, it is determined that the current game status satisfies the preset switching condition corresponding to the target interface, the second interface being called in response to the second status switching request, and the second status switching request being used for requiring to switch the current game status of the game platform to the initial status when the game is not started.

The target game status is determined as the initial status when the game is not started.

In a case where the edge computing device receives the second status switching request via the second interface, the edge computing device may judge whether the current game status of the game platform is the status corresponding to the first game stage. If the current game status of the game platform is the status corresponding to the first game stage, it may be determined that the target game status is the initial status when the game is not started, such that the current game status of the game platform is switched to the initial status when the game is not started. If the current game status of the game platform is not the status corresponding to the first game stage, the second status switching request may be rejected and an error code representing that the second status switching request is rejected is sent to the service-side device.

It can be seen that in a case where the target interface is a second interface and the current game status represents the game status corresponding to the first stage after the game is started, the status corresponding to the first game stage may be switched to the initial status when the game is not started accurately.

In some embodiments, in a case where the target interface is the third interface and the current game status of the game platform is the game halt status, is may determine that the current game status satisfies the preset switching condition corresponding to the target interface. The third interface is called in response to the third status switching request, and the third status switching request is used for requiring to switch the current game status of the game platform to the status corresponding to the second game stage. The second game stage is not the first game stage after the game is started.

The target game status is determined as a status corresponding to the second game stage In the embodiments of the disclosure, in a case where the edge computing device receives the third status switching request via the third interface, the edge computing device may judge whether the current game status of the game platform is the game halt status. If the current game status of the game platform is the game halt status, it may be determined that the target game status is the status corresponding to the second game stage, such that the current game status of the game platform is switched to the status corresponding to the second game stage. If the current game status of the game platform is not the game halt status, the third status switching request may be rejected and an error code representing that the third status switching request is rejected is sent to the service-side device.

It can be seen that in a case where the target interface is the third interface and the current game status is in the game halt status, the game halt status may be switched to the status corresponding to the second game stage accurately.

In some embodiments, in a case where the target interface is the fourth interface and the current game status of the game platform represents the game halt status, it may determine that the current game status satisfies the preset switching condition corresponding to the target interface. The fourth interface is called in response to the fourth status switching request, and the fourth status switching request is used for requiring to switch the current game status of the game platform to the status corresponding to the first game stage.

In the embodiments of the disclosure, in a case where the edge computing device receives the fourth status switching request via the fourth interface, the edge computing device may judge whether the current game status of the game platform is the game halt status. If the current game status of the game platform is the game halt status, it may be determined that the target game status is the status corresponding to the first game stage, such that the current game status of the game platform is switched to the status corresponding to the first game stage. If the current game status of the game platform is not the game halt status, the fourth status switching request may be rejected and an error code representing that the fourth status switching request is rejected is sent to the service-side device.

It can be seen that in a case where the target interface is the fifth interface and the current game status is in the game halt status, the game halt status may be switched to the status corresponding to the first game stage accurately.

In some embodiments, a game event and/or game object in the image of the game platform may be recognized to obtain a corresponding recognition result; in response to that a recognition result obtained by recognizing a game event and/or a game object in a game platform image satisfies an automatic switching condition and the current game state is different from a target game status corresponding to the automatic switching condition, the manual status switching request of the game platform is acquired, the target game status corresponding to the manual switching request being as same as the target game status corresponding to the automatic switching condition.

In the embodiments of the disclosure, the game platform image may include one frame of the image or multiple frames of the image. In the embodiment of the disclosure, a game platform may be shot using at least one camera to obtain video data or image data, and then the at least one frame of game platform image is acquired from the video data or the image data. In some embodiments, the camera that shoots the game platform may be a camera that is located over the game platform and configured to shoot a plan-view image of the game platform, or may be a camera for shooting the game platform from another view. Correspondingly, each frame of game platform image may be the plan-view image or a game platform image of the other view. In some other embodiments, each frame of game platform image may also be an image obtained by performing fusion processing on the plan-view image and the game platform image of the other view.

After the game platform image is obtained, the game event and/or game object in the game platform image may be recognized to obtain the corresponding recognition result.

Exemplarily, after the game platform image is obtained, the game platform image may be detected through a computer vision processing technology to obtain the detection result of the game platform image. In some embodiments, each frame of game platform image may be detected to obtain a target object in each frame of game platform image. The target object at least includes a money substitute. Exemplarily, the target object may further include a marker of the game platform, a human body, and a playing card. The human body in the target object may include the whole human body, or may include part of the human body such as a hand and the face. The playing card in the target object may be a playing card of a type such as spade, heart, diamond, and club.

After the target object in each frame of image is obtained, a corresponding recognition result may be determined based on the target object in each frame of image. The recognition result may include at least one of human body information, game article information and money substitute information. For example, in a case where the game object includes human body, the recognition result includes a human body position, a human body identity, a human body size or other information. In a case where the game object includes a game article, the recognition result includes information such as a type of the game article, a position of the game article and a quantity of the game article. In a case where the game object includes the money substituent, the recognition result includes information such as the quantity of the money substituent and the position of the money substituent.

In some embodiments, the game event in the game platform image may be determined according to the recognition result of the game object in the game platform image.

It is to be understood that the current game state of the game platform is usually related to the game object and/or the game event, and therefore, whether the automatic switching condition is met or not may be judged accurately according to the recognition result obtained by recognizing the game event and/or the game object in the game platform image. If not, the current game state is kept unchanged. If so, the game status of the game platform is switched automatically according to the target game status corresponding to the automatic switching condition.

In some embodiments, services such as data analyzing service (DAS) may be at least used for analyzing the recognition result. Whether the current game status needs to be switched or not may be judged and the target game status is determined in a case where it is necessary to switch the current game status by subscribing the topic message corresponding to the message-oriented middleware RocketMQ in services such as DAS.

Here, the message-oriented middleware RocketMQ is a distributed open source message queue of a queue model. The topic of the Topic message is used for definition and is configured at one end of the server, and the consumer may subscribe according to the topic of the message, such that the message may be classified. The data analyzing service may process data for different business logics to send some warning or normal data emerging in the game process to the message-oriented middleware RocketMQ.

It is to be understood that by subscribing the topic message corresponding to the message-oriented middleware RocketMQ in services such as DAS, it is favorable to switch the game status of the game platform from the current game status to the target game status, which is beneficial to satisfaction of the timeliness requirement on the game status.

In the embodiments of the disclosure, in response to that a recognition result obtained by recognizing a game event and/or a game object in a game platform image satisfies an automatic switching condition and the current game state is different from a target game status corresponding to the automatic switching condition, it illustrates that the game status of the game platform may not be switched to the target status according to the requirement. Under the condition, it is necessary to switch the game status manually. Exemplarily, the manual status switching request of the game platform may be received, and the target game status corresponding to the manual switching request is as same as the target game status corresponding to the automatic switching condition.

After the manual switching request is received, the game status may be switched manually according to the above-mentioned content.

In some embodiments, in a case where the first game stage is over according to the recognition result, it is determined that the recognition result satisfies the automatic switching condition, the target game status corresponding to the automatic switching condition being a status corresponding to the second game stage.

Herein, in a case where it is determined that the first game stage is not over according to the recognition result, the current game status of the game platform may be kept unchanged.

Exemplarily, in the playing card game, in a case where the first playing card is recognized in a preset target area of the game plate, it is determined that the first game stage is over, the preset target area representing that the playing cards are allowed to fall into the area in the game process.

It can be seen that in a case where the first game stage is over, if the game status of the game platform may not be switched to the status corresponding to the second game stage automatically, the game status of the game platform may be switched to the status corresponding to the second game stage in a manual switching mode, which satisfies the actual demand.

In some embodiments, the current game status of the game platform represents the status corresponding to the second game stage. In a case where it is determined that an abnormal game event occurs and/or the status of the game object is abnormal according to the recognition result, the automatic switching condition according to the recognition result is determined, the target game status corresponding to the automatic switching condition being the game halt status.

Here, in a case where an abnormal game event is not determined and/or the status of the game object is not abnormal, the current game status of the game platform may be kept unchanged.

Exemplarily, in a case where the behavior of the game participant is the preset abnormal behavior, the abnormal game event is determined.

It can be seen that in a case where an abnormal game event is not determined and/or the status of the game object is not abnormal, if the game status of the game platform may not be switched to the status corresponding to the game halt stage automatically, the game status of the game platform may be switched to the status corresponding to the game halt status in a manual switching mode, which satisfies the actual demand.

In some embodiments, the current game status of the game platform represents the status corresponding to the second game stage, and the second game stage represents the last game stage after the game is started.

Correspondingly, in a case where the second game stage is over according to the recognition result, it is determined that the recognition result satisfies the automatic switching condition, the target game status corresponding to the automatic switching condition being a status corresponding to the first game stage. Herein, in a case where it is determined that the second game stage is not over according to the recognition result, the current game status of the game platform may be kept unchanged.

It can be seen that in a case where the second game stage is over, it illustrates that the game is over, if the game status of the game platform may not be switched to the status corresponding to the first game stage automatically, the game status of the game platform may be switched to the status corresponding to the first game stage in a manual switching mode so as to start the next game, which satisfies the actual demand.

The embodiments of the disclosure will be exemplarily described below in combination with an application scene. In the application scene, the game scene is an intelligent casino scene, the game platform is a gaming table, and the money substitute is a chip. The edge computing device may be arranged on the game table locally, the service-side device is the Casino Management System (CMS), and in an electronic device locally arranged on the game platform, there are a button for displaying the game status and a button for switching the game status manually. The electronic device locally arranged on the game platform and the CMS form a communication connection and the CMS and the edge computing device form a communication connection.

The intelligent casino scene may be poker. Running stages of poker may include an idle stage, a betting stage, a gaming stage, a payout stage, and a halt stage. The idle status is the initial state when the game is not started, the betting status is the status corresponding to the first game stage, and the gaming status and the payout status are the state corresponding to the second game stage.

Here, the betting status represents the game status corresponding to the betting stage before the dealer deals the cards; the dealing status represents the game status corresponding to the dealer dealing stage; the payout status represents the game status corresponding to payout or money collection stage of the dealer after the result of playing card game is obtained; if a card dealing operation of the dealer violates a game rule or a regulation of the casino (whether the card dealing operation of the dealer complies with the game rule or the casino regulation by recognizing the behavior of the dealer), the game status shall be switched to the halt status. Exemplarily, after the game status is switched to the halt status, the edge computing device may send warning information to the service-side device timely, and the service-side device may send the warning information to the local electronic device of the gaming table, which is beneficial to achievement of normal order operation of the game.

Exemplarily, poker may be Baccarat or another type of game. In a Baccarat scene, the dealer draws four to six cards from three to eight decks of shuffled cards, and a win-lose result may be obtained according to a rule. The win-lose result may include: the player, the banker, TIE, super six, etc. Gained or paid money of the player and the casino is calculated according to the win-lose result of each round of game, payout ratios in different scenes, and whether to take commissions. There are certain rules for card dealing of the dealer and peeking of the player, and if the rules are broken, the monitoring system needs to output warning information.

Figure 2:
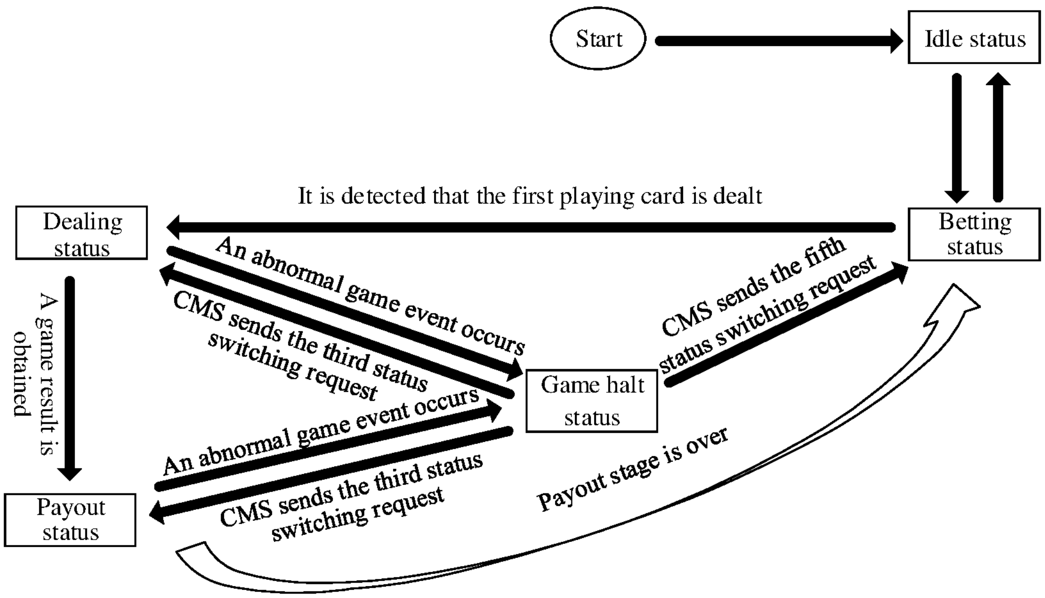
FIG. 2 is another flowchart of a status switching method of an embodiment of the disclosure.
Figure 3:
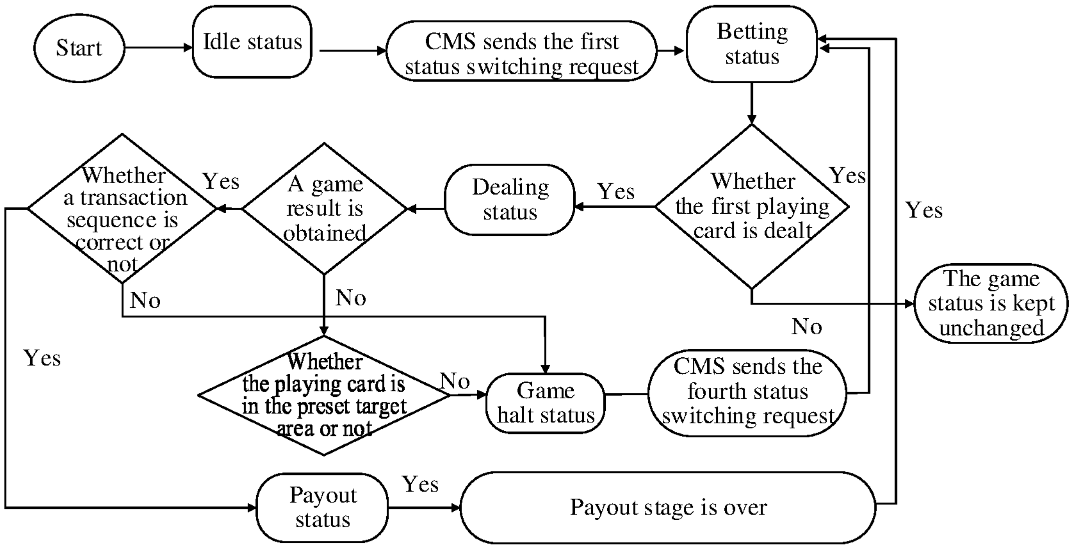
FIG. 3 is further another flowchart of a status switching method of an embodiment of the disclosure.

Referring to FIG. 2 and FIG. 3, after the edge computing device is started and electrified, the game status of the game table is in the idle status.

A dealer adjusts a button status of the electronic device manually. The electronic device sends a first status switching request to CMS, the CMS sends the fourth status switching request to the edge computing device by calling a/v1/game_state/betting interface which is the first interface. After receiving the first status switching request, the edge computing device judges whether the current game status is the idle status or not, if yes, the current game status is switched to a betting status, and the play can bet after the current game status is switched to the betting status, and if the current game status is not the idle status is not empty, the first status switching request is rejected and a corresponding error code is sent to the CMS.

Referring to FIG. 2, the dealer adjusts a button status of the electronic device manually. The electronic device sends a second status switching request to CMS, the CMS sends the fourth status switching request to the edge computing device by calling a/v1/game_state/idle interface which is the second interface. After receiving the second status switching request, the edge computing device judges whether the current game status is the betting status or not, if yes, the current game status is switched to an idle status and if not, the second status switching request is rejected and a corresponding error code is sent to the CMS.

Referring to FIG. 2 and FIG. 3, whether the dealer deals the first playing card or not may be judged according to the recognition result of the game table image. If the dealer does not deal the first playing card, the current game status is kept unchanged. If the dealer deals the first playing card, it illustrates that the betting process of the game is over, and at the moment, the edge computing device may switch the game status of the game platform from the betting status to the dealing status.

Referring to FIG. 2, whether the abnormal game event occurs or not may be judged according to the recognition result of the game table image. If so, the warning information is sent and the game status of the game platform is switched from the dealing status to the game halt status. If not, the current game status may be kept unchanged.

Exemplarily, whether operation of the deal is mistaken or not may be judged according to the recognition result of the game table image. If so, the abnormal game event is determined.

Exemplarily, referring to FIG. 3, whether the game result is obtained may be judged according to the recognition result of the game table image. If not, whether the playing card is in the preset target area or not may be judged according to the recognitions result of the game table image. If the playing card is not in the preset target area, it is determined that the abnormal game event occurs. If the playing card is in the preset target area, it may be determined that the abnormal game event does not occur.

Referring to FIG. 3, in a case where the game result is determined according to the recognition result of the game table image, whether the transaction sequence of the game is correct or not may be judged according to the recognition result of the game table image. If the transaction sequence of the game is incorrect, it may be determined that the abnormal game event occurs.

Referring to FIG. 2, the dealer adjusts a button status of the electronic device manually. The electronic device sends a third status switching request to CMS, the CMS sends the third status switching request to the edge computing device by calling a/v1/game_state/resume interface which is the fourth interface. After receiving the third status switching request, the edge computing device judges whether the current game status is the game halt status or not, if yes, the current game status is switched to a dealing status and if not, the third status switching request is rejected and a corresponding error code is sent to the CMS.

In a case where the current game status represents the dealing status, whether the dealing stage is over or not may be judged according to the recognition result of the game table image. If the dealing stage is over, the edge computing device may switch the game status of the game platform from the dealing status to the payout status. If the dealing stage is not over, the current game status may be kept unchanged.

Exemplarily, referring to FIG. 2, whether the game result is obtained or not may be judged according to the recognition result of the game table image. In a case where the game result is obtained, it may be considered that the dealing stage is over, and therefore, the game status of the game platform may be switched from the dealing status to the payout status.

Exemplarily, referring to FIG. 3, in a case where the game result is determined according to the recognition result of the game table image, whether the transaction sequence of the game is correct or not may be judged according to the recognition result of the game table image. If so, it may be determined that the dealing stage is over, and therefore, the game status of the game platform may be switched from the dealing status to the payout status.

Referring to FIG. 2, in a case where the current game status is the payout status, whether the abnormal game event occurs or not may be judged according to the recognition result of the game table image. If so, the warning information is sent and the game status of the game platform is switched from the dealing status to the game halt status. If not, the current game status may be kept unchanged.

Referring to FIG. 2, the dealer adjusts a button status of the electronic device manually. The electronic device sends a third status switching request to CMS, the CMS sends the third status switching request to the edge computing device by calling the third interface. After receiving the third status switching request, the edge computing device judges whether the current game status is the game halt status or not, if yes, the current game status is switched to a payout status and if not, the third status switching request is rejected and a corresponding error code is sent to the CMS.

In a case where the current game status represents the payout status, whether the payout stage is over or not may be judged according to the recognition result of the game table image. If the payout stage is over, the edge computing device may switch the game status of the game platform from the payout status to the betting status. Thus, a new round of game is started and the player may bet. If the payout stage is not over, the current game status may be kept unchanged.

Exemplarily, information of playing cards, boxes placing chips and human hands may be determined according to the recognition result of an image of a gambling table. In a case where the playing cards disappear from a preset target region, the positions of the boxes placing the chips are not changed, and the human hands appear in a preset region of abandoned playing cards, it may be considered that a payout stage is over.

Referring to FIG. 2 and FIG. 3, a dealer adjusts a button status of the electronic device manually. The electronic device sends a fourth status switching request to CMS, the CMS sends the fourth status switching request to the edge computing device by calling a v1/game_state/void interface which is the fourth interface. After receiving the fourth status switching request, the edge computing device judges whether the current game status is the game halt status or not, if yes, the current game status is switched to a betting status and if not, the fourth status switching request is rejected and a corresponding error code is sent to the CMS.

The status switching method of the embodiments of the disclosure may be used for switching the game statuses of various poker games and has the characteristics of low cost, simple implementation and high precision.

It can be understood by those skilled in the art that, in the method of the specific implementation modes, the writing sequence of each step does not mean a strict execution sequence and is not intended to form any limit to the implementation process and a specific execution sequence of each step should be determined by functions and probable internal logic thereof.

Based on the status switching method provided by the abovementioned embodiments, the embodiments of the disclosure provide a state switching apparatus.

Figure 4:
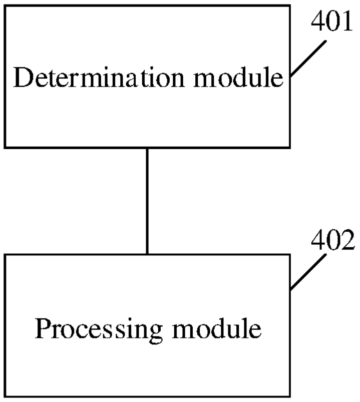
FIG. 4 is a schematic structural diagram of a status switching apparatus of an embodiment of the disclosure.

FIG. 4 is a composition structure schematic diagram of a status switching apparatus of an embodiment of the disclosure. As shown in FIG. 4, the apparatus may include a determination module 401 and a processing module 402.

The determination module 401 is configured to, in response to that a manual status switching request to a game platform is acquired, determine a current game status of the game platform.

The processing module 402 is configured to, in response to that the current game status satisfies a switching condition corresponding to the manual status switching request, switch the game status of the game platform from the current game status to a target game status corresponding to the manual status switching request.

In some embodiments, the processing module 402 is specifically configured to determine the target interface called by the manual status switching request, and in a case where the current game status satisfies a preset switching condition corresponding to the target interface, to switch the game status of the game platform from the current game status to the target game status corresponding to the manual status switching request.

In some embodiments, the processing module 402 is further configured to:

in a case where the target interface is a first interface and the current game status is in an initial status when a game is not started, determine that the current game status satisfies the preset switching condition corresponding to the target interface, the first interface being called in response to the first status switching request, the first status switching request being used for requiring to switch the current game status of the game platform to a status corresponding to a first game stage, and the first game stage being a first game stage after the game is started, and determine that the target game status is a status corresponding to the first game stage.

In some embodiments, the processing module 402 is further configured to:

in a case where the target interface is a second interface and the current game status is in a status corresponding to the first game stage, determine that the current game status satisfies the preset switching condition corresponding to the target interface, the second interface being called in response to the second status switching request, the second status switching request being used for requiring to switch the current game status of the game platform to the initial status when the game is not started, and the first game stage being the first game stage after the game is started, and determine that the target game status is the initial status when the game is not started.

In some embodiments, the processing module 402 is configured to:

in a case where the target interface is a third interface and the current game status is in a game halt status, determine that the current game status satisfies the preset switching condition corresponding to the target interface, the third interface being called in response to the third status switching request, the third status switching request being used for requiring to switch the current game status of the game platform to a status corresponding to a second game stage, and determine that the target game status is a status corresponding to the second game stage, and the second game stage is not the first game stage after the game is started.

In some embodiments, the processing module 402 is configured to:

in a case where the target interface is a fourth interface and the current game status is in the game halt status, determine that the current game state satisfies the preset switching condition corresponding to the target interface, the fourth interface being called in response to the fourth status switching request, the fourth status switching request being used for requiring to switch the current game state of the game platform to a status corresponding to a first game stage, and the first game stage being a first game stage after the game is started, and determine that the target game status is a status corresponding to the first game stage.

In some embodiments, the determination module 401 is further configured to acquire the manual status switching request of the game platform sent by a game management system, the game management system being in response to a manual status switching operation of a game manager to generate the manual status switching request.

In some embodiments, the processing module 402 is further configured to:

in response to that a recognition result obtained by recognizing a game event and/or a game object in a game platform image satisfies an automatic switching condition and the current game state is different from a target game status corresponding to the automatic switching condition, acquire the manual status switching request of the game platform, the target game status corresponding to the manual switching request being as same as the target game status corresponding to the automatic switching condition.

In some embodiments, the processing module 402 is further configured to:

in a case where the first game stage is over according to the recognition result, determine that the recognition result satisfies the automatic switching condition, the target game status corresponding to the automatic switching condition being a status corresponding to the second game stage; the first game stage is the first game stage after the game is started, and the second game stage is not the first game stage after the game is started.

In some embodiments, the current game status represents the status corresponding to the second game stage, and the second game stage is not the first game stage after the game is started.

The processing module 402 is further configured to, in a case where an abnormal game event is determined and/or the status of the game object is abnormal according to the recognition result, determine the automatic switching condition according to the recognition result, the target game status corresponding to the automatic switching condition being the game halt status.

In some embodiments, the processing module 402 is configured to:

in a case where the second game stage is over according to the recognition result, determine that the recognition result satisfies the automatic switching condition, the target game status corresponding to the automatic switching condition being a status corresponding to the first game stage, wherein the first game stage is the first game stage after the game is started, and the second game stage is the last game stage after the game is started.

In practical applications, the determination module 401 and the processing module 402 may be implemented using a processor in an edge computing device. The processor may be at least one of an ASIC, a DSP, a DSPD, a PLD, an FPGA, a CPU, a controller, a microcontroller, or a microprocessor.

In addition, each function module in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part thereof may be embodied in form of software product, and the computer software product is stored in a storage medium, including a plurality of instructions configured to enable a computer device (which may be a personal computer, a server, a network device, etc.) or a processor to execute all or part of the steps of the method in the embodiment. The abovementioned storage medium includes: various media capable of storing program codes such as a U disk, a mobile hard disk, a ROM, a RAM, a magnetic disk or an optical disk.

Specifically, a computer program instruction corresponding to the image processing method in the embodiments may be stored in a storage medium such as an optical disk, a hard disk and a U disk. When the computer program instruction corresponding to the status switching method in the storage medium is read or executed by an electronic device, any status switching method of the abovementioned embodiments is implemented.

Figure 5:
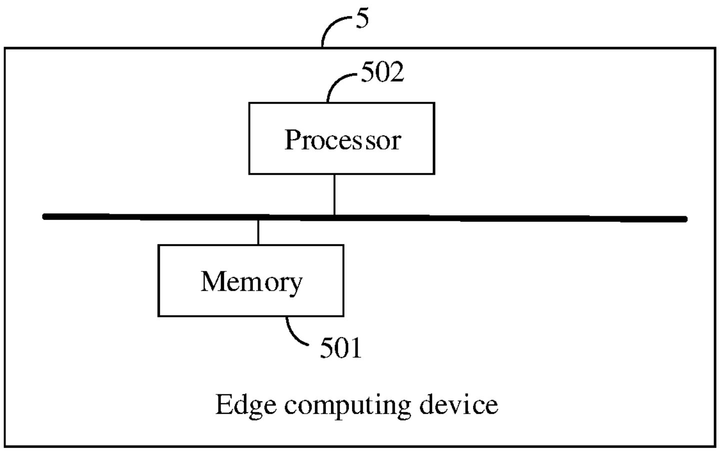
FIG. 5 is a schematic structural diagram of an edge computing device of an embodiment of the disclosure.

Based on the same technical concept of the abovementioned embodiments, referring to FIG. 5, an electronic device 5 provided in the embodiments of the disclosure is shown, which may include a memory 501 and a processor 502.

The memory 501 is configured to store a computer program and data.

The processor 502 is configured to execute the computer program stored in the memory to implement any status switching method of the abovementioned embodiments.

In practical applications, the memory 501 may be a volatile memory such as a RAM, or a non-volatile memory such as a ROM, a flash memory, an HDD or a Solid-State Drive (SSD), or a combination of the memories, and provides instructions and data for the processor 502.

The processor 502 may be at least one of an ASIC, a DSP, a DSPD, a PLD, an FPGA, a CPU, a controller, a microcontroller, or a microprocessor. It can be understood that, for different devices, other electronic components may be configured to realize functions of the processor, and no specific limits are made in the embodiment of the disclosure.

In some embodiments, functions or modules of the apparatus provided in the embodiment of the disclosure may be configured to execute the method described in the method embodiment and specific implementation thereof may refer to the descriptions about the method embodiment and, for simplicity, will not be elaborated herein.

The above descriptions about the embodiments focus on differences between each embodiment and the same or similar parts may refer to each other and will not be elaborated herein for simplicity.

The methods disclosed in each method embodiment provided in the application may be freely combined without conflicts to obtain new method embodiments.

The characteristics disclosed in each product embodiment provided in the application may be freely combined without conflicts to obtain new product embodiments.

The characteristics disclosed in each method or device embodiment provided in the application may be freely combined without conflicts to obtain new method embodiments or device embodiments.

From the above descriptions about the implementation modes, those skilled in the art may clearly know that the method of the abovementioned embodiments may be implemented in a manner of combining software and a necessary universal hardware platform, and of course, may also be implemented through hardware, but the former is an implementation mode under many circumstances. Based on such an understanding, the disclosure substantially or parts making contributions to the conventional art may be embodied in form of software product, and the computer software product is stored in a storage medium (for example, a ROM/RAM, a magnetic disk and an optical disk), including a plurality of instructions configured to enable a terminal (which may be a personal computer, a server, an air conditioner, a network device, etc.) to execute the method in each embodiment of the disclosure.

The embodiments of the disclosure are described above in combination with the drawings, but the disclosure is not limited to the abovementioned specific implementation modes. The abovementioned specific implementation modes are not restrictive but only schematic, those of ordinary skill in the art may be inspired by the disclosure to implement many forms without departing from the purpose of the disclosure and the scope of protection of the claims, and all these shall fall within the scope of protection of the disclosure.

What is claimed is:

1. A status switching method, performed by an edge computing device, the method comprising:

in response to acquiring a manual status switching request to a game platform from a service-side device, determining a current game status of the game platform;

determining a target interface of the edge computing device called by the manual status switching request;

determining a game status switching mode corresponding to the target interface, wherein different target interfaces correspond to different game status switching modes; and in response to the current game status satisfying a preset switching condition corresponding to the target interface, switching a game status of the game platform from the current game status to a target game status corresponding to the manual status switching request, wherein the preset switching condition comprises the current game status matching the game status switching mode corresponding to the target interface, and wherein the game status switching mode comprises switching from the current game status to the target game status.

2. The method according to claim 1, wherein the method further comprises:

in a case where the target interface is a first interface and the current game status is in an initial status when a game is not started, determining that the current game status satisfies the preset switching condition corresponding to the target interface, the first interface being called in response to a first status switching request, the first status switching request being used for requiring to switch from the current game status of the game platform to a status corresponding to a first game stage, and the first game stage being a first game stage after the game is started; and determining that the target game status is a status corresponding to the first game stage.

3. The method according to claim 1, wherein the method further comprises:

in a case where the target interface is a second interface and the current game status is in a status corresponding to a first game stage, determining that the current game status satisfies the preset switching condition corresponding to the target interface, the second interface being called in response to a second status switching request, the second status switching request being used for requiring to switch from the current game status of the game platform to an initial status when a game is not started, and the first game stage being a first game stage after the game is started; and determining that the target game status is the initial status when the game is not started.

4. The method according to claim 1, wherein the method further comprises:

in a case where the target interface is a third interface and the current game status is in a game halt status, determining that the current game status satisfies the preset switching condition corresponding to the target interface, the third interface being called in response to a third status switching request, the third status switching request being used for requiring to switch from the current game status of the game platform to a status corresponding to a second game stage; and determining that the target game status is a status corresponding to the second game stage, and the second game stage is not a first game stage after a game is started.

5. The method according to claim 1, wherein the method further comprises:

in a case where the target interface is a fourth interface and the current game status is in a game halt status, determining that the current game status satisfies the preset switching condition corresponding to the target interface, the fourth interface being called in response to a fourth status switching request, the fourth status switching request being used for requiring to switch from the current game status of the game platform to a status corresponding to a first game stage, and the first game stage being a first game stage after a game is started; and determining that the target game status is a status corresponding to the first game stage.

6. The method according to claim 1, wherein the method further comprises:

acquiring the manual status switching request of the game platform sent by a game management system, the game management system generating the manual status switching request in response to a manual status switching operation of a game manager.

7. The method according to claim 1, wherein the method further comprises:

in response to a recognition result obtained by recognizing at least one of a game event or a game object in a game platform image satisfying an automatic switching condition and the current game status being different from a target game status corresponding to the automatic switching condition, acquiring the manual status switching request of the game platform, the target game status corresponding to the manual status switching request being same as the target game status corresponding to the automatic switching condition.

8. The method according to claim 7, wherein the method further comprises:

in a case where a first game stage is over according to the recognition result, determining that the recognition result satisfies the automatic switching condition, the target game status corresponding to the automatic switching condition being a status corresponding to a second game stage; the first game stage is a first game stage after a game is started, and the second game stage is not the first game stage after the game is started.

9. The method according to claim 7, wherein the current game status represents a status corresponding to a second game stage, and the second game stage is not a first game stage after a game is started;

the method further comprises: in a case where it is determined that at least one of an abnormal game event occurs or a status of the game object is abnormal according to the recognition result, determining the automatic switching condition according to the recognition result, the target game status corresponding to the automatic switching condition being a game halt status.

10. The method according to claim 7, wherein the method further comprises:

in a case where a second game stage is over according to the recognition result, determining that the recognition result satisfies the automatic switching condition, the target game status corresponding to the automatic switching condition being a status corresponding to a first game stage, wherein the first game stage is a first game stage after a game is started, and the second game stage is a last game stage after the game is started.

11. An edge computing device, the edge computing device comprising a processor and a memory configured to store a computer program configured to run on the processor, wherein the processor is configured to run the computer program to:

in response to acquiring a manual status switching request to a game platform from a service-side device, determine a current game status of the game platform;

determine a target interface of the edge computing device called by the manual status switching request;

determine a game status switching mode corresponding to the target interface, wherein different target interfaces correspond to different game status switching modes; and in response to the current game status satisfying a preset switching condition corresponding to the target interface, switch a game status of the game platform from the current game status to a target game status corresponding to the manual status switching request, wherein the preset switching condition comprises the current game status matching the game status switching mode corresponding to the target interface, and wherein the game status switching mode comprises switching from the current game status to the target game status.

12. The edge computing device according to claim 11, wherein the processor is further configured to:

in a case where the target interface is a first interface and the current game status is in an initial status when a game is not started, determine that the current game status satisfies the preset switching condition corresponding to the target interface, the first interface being called in response to a first status switching request, the first status switching request being used for requiring to switch from the current game status of the game platform to a status corresponding to a first game stage, and the first game stage being a first game stage after the game is started; and determine that the target game status is a status corresponding to the first game stage.

13. The edge computing device according to claim 11, wherein the processor is further configured to:

in a case where the target interface is a second interface and the current game status is in a status corresponding to a first game stage, determine that the current game status satisfies the preset switching condition corresponding to the target interface, the second interface being called in response to a second status switching request, the second status switching request being used for requiring to switch from the current game status of the game platform to an initial status when a game is not started, and the first game stage being a first game stage after the game is started; and determine that the target game status is the initial status when the game is not started.

14. The edge computing device according to claim 11, wherein the processor is further configured to:

in a case where the target interface is a third interface and the current game status is in a game halt status, determine that the current game status satisfies the preset switching condition corresponding to the target interface, the third interface being called in response to a third status switching request, the third status switching request being used for requiring to switch from the current game status of the game platform to a status corresponding to a second game stage; and determine that the target game status is a status corresponding to the second game stage, and the second game stage is not a first game stage after a game is started.

15. The edge computing device according to claim 11, wherein the processor is further configured to:

in a case where the target interface is a fourth interface and the current game status is in a game halt status, determine that the current game status satisfies the preset switching condition corresponding to the target interface, the fourth interface being called in response to a fourth status switching request, the fourth status switching request being used for requiring to switch from the current game status of the game platform to a status corresponding to a first game stage, and the first game stage being a first game stage after a game is started; and determine that the target game status is a status corresponding to the first game stage.

16. The edge computing device according to claim 11, wherein the processor is further configured to:

acquire the manual status switching request of the game platform sent by a game management system, the game management system generating the manual status switching request in response to a manual status switching operation of a game manager.

17. The edge computing device according to claim 11, wherein the processor is further configured to:

in response to that a recognition result obtained by recognizing at least one of a game event or a game object in a game platform image satisfying an automatic switching condition and the current game status being different from a target game status corresponding to the automatic switching condition, acquire the manual status switching request of the game platform, the target game status corresponding to the manual status switching request being as same as the target game status corresponding to the automatic switching condition.

18. A non-transitory computer readable storage medium, having a computer program stored therein, wherein when executed by a processor of an edge computing device, the computer program is configured to:

in response to acquiring a manual status switching request to a game platform from a service-side device, determine a current game status of the game platform;

determine a target interface of the edge computing device called by the manual status switching request;

determine a game status switching mode corresponding to the target interface, wherein different target interfaces correspond to different game status switching modes; and in response to the current game status satisfying a preset switching condition corresponding to the target interface, switch a game status of the game platform from the current game status to a target game status corresponding to the manual status switching request, wherein the preset switching condition comprises the current game status matching the game status switching mode corresponding to the target interface, and wherein the game status switching mode comprises switching from the current game status to the target game status.

* * * * *